(12) United States Patent
Turner et al.

(10) Patent No.: US 8,306,046 B2
(45) Date of Patent: Nov. 6, 2012

(54) COMPUTING DEVICE AND COMMUNICATIONS FRAMEWORK

(75) Inventors: Victoria Turner, London (GB); Petr Smrz, London (GB); Michael Zurowski, London (GB); Richard Collin, London (GB)

(73) Assignee: Nokia Corporation, Espoo (FI)

(*) Notice: Subject to any disclaimer, the term of this patent is extended or adjusted under 35 U.S.C. 154(b) by 203 days.

(21) Appl. No.: 12/524,051

(22) PCT Filed: Jan. 23, 2008

(86) PCT No.: PCT/GB2008/000242
§ 371 (c)(1),
(2), (4) Date: Jun. 15, 2010

(87) PCT Pub. No.: WO2008/090346
PCT Pub. Date: Jul. 31, 2008

(65) Prior Publication Data
US 2010/0278104 A1    Nov. 4, 2010

(30) Foreign Application Priority Data

Jan. 23, 2007 (GB) .................................. 0701284.2
Jan. 23, 2007 (GB) .................................. 0701285.9

(51) Int. Cl.
*H04L 12/56* (2006.01)
*H04J 1/16* (2006.01)
(52) U.S. Cl. .......... 370/419; 370/241; 370/252; 370/466
(58) Field of Classification Search .................. 370/252, 370/466, 419, 241
See application file for complete search history.

(56) References Cited

U.S. PATENT DOCUMENTS

| 2002/0085516 | A1 | 7/2002 | Bridgelall |
| 2004/0151136 | A1 | 8/2004 | Gage |
| 2009/0252070 | A1* | 10/2009 | Connors et al. ............... 370/311 |
| 2011/0116500 | A1* | 5/2011 | Petry et al. ................... 370/389 |

FOREIGN PATENT DOCUMENTS

WO    0135243 A1    5/2001

OTHER PUBLICATIONS

Search Report from Great Britain Application No. 0801229.6, dated Oct. 8, 2008, 6 pages. International Search Report and Written Opinion of the International Searching Authority for PCT Application No. PCT/GB2008/000242, dated Jun. 20, 2008, 13 pages.
Office Action from Chinese Patent Application No. 200880007396.5, dated May 21, 2012.

* cited by examiner

*Primary Examiner* — John Pezzlo
(74) *Attorney, Agent, or Firm* — Alston & Bird LPP

(57) ABSTRACT

A computing device having communications framework for a protocol stack. The framework includes a number of layers, each layer representing a layer in a protocol stack. At each layer, a protocol is a bearer of an upper adjacent layer. Each layer is arranged to monitor the availability of one or more alternate bearer layers below. Where there is more than one alternate bearer layer below, a layer is said to be mobile. In the event of a new bearer layer becoming available at a mobile layer, a decision is made as to whether or not to migrate to that bearer layer based on established policies in the mobile layer and, optionally, on communication with higher layers or with the client application. If the decision to migrate is positive, the mobile layer then ensures establishment of the new bearer layer and initiates and completes migration to it. The client of a connection active over the connection stack need not be disturbed by mobility events within the stack providing the connection.

19 Claims, 5 Drawing Sheets

COMPUTING DEVICE AND COMMUNICATIONS FRAMEWORK

This application was originally filed as PCT Application No. PCT/GB2008/000242 filed on Jan. 23, 2008 and claims priority to GB Application No. 0701284.2 filed on Jan. 23, 2007.

The present invention relates to computing device having a communications framework and to a method of operation of such a device.

BACKGROUND TO THE INVENTION AND PRIOR ART

Communications between remote computers is enabled through the use of so-called "protocol stacks". Applications running on remote computers do not communicate directly with each other. Instead, messages, or other communications, are sent via a protocol stacks, such as the TCP/IP (Transmission Control Protocol/Internet Protocol) stack. Protocol stacks make it easier for applications to communicate with each other. They remove the need for applications to understand the details of, for example, how data must be sent over an Ethernet connection. Instead, the application simply passes the data to the top layer of the protocol stack, and the stacks on the local and remote computers ensure that the data gets to the application at the remote end.

Protocol stacks are implemented by communications frameworks which are typically provided as part of the operating system on a computing device. A communications framework typically has an API (Application Programming Interface) which is the point through which applications gain access to the communications framework. FIG. 1 shows a communications model 101, known from the prior art, which may be used when, for example, a user wishes to send an email to a remote computer. The left hand-side of the diagram represents components running on the local computer 102, or connected to the local computer, and the right-hand side of the diagram represents components, running on, or connected to the remote computer 103. The local computer 102 has loaded thereon an email client 104 which is arranged to send and receive emails. The remote computer also has an email client 105. As noted above, these clients cannot communicate directly with each other. Instead, the email clients must send and receive messages through the communications framework which is available on the respective computers. The communications networks on each computing device include equivalent components. These components include communications framework APIs 106, 107, transport protocols 108, 109, network protocols 110, 111 and link protocols 112, 113. The communications framework APIs 5, 6 provide the interface to the communications framework. As is well known in the art, transport protocols are responsible for delivering data to, and receiving data from, applications running on a computer. In the present case, the transport protocols 108, 109 are the TCP protocol, mentioned above. Network protocols ensure that packets of data are correctly delivered from one endpoint to another. In the present case, the network protocols 110, 111 are the IP protocol, also mentioned above. Link protocols are responsible for delivery of data between adjacent nodes in a network and depend on the bearer technology being used. For example, link protocols include Ethernet, IEEE 802.11 link layer protocols and GPRS (General Packet Radio Service).

At the bottom of the stack are bearers 114, 115, the type of which depends on the hardware 116, 117. For example, if a computer is connected to the Internet via a WiFi™ access point, then the hardware is a WiFi™ adapter, and the bearer is a radio access bearer which is established over the air interface between the computer and the access point.

Before a message is sent, the communications framework establishes a particular set of protocols depending on the application concerned, the request from the application and the available communications hardware. If a user wishes to send an email from a mobile phone, a cellular connection (for example via 3G) will be established as well as the necessary set of protocols required to send data over the 3G connection. A message may then be sent over the communications stack which has been established.

Ordinarily, the communications stack is static and persists for the lifetime of the connection. A particular set of protocols is established over a particular connection and the required communication takes place. The communications stack is then torn down. There is no mobility in this scenario as mobility is not required. In other words, all layers of the communications stack provide what is required of them and there is no need to substitute one layer for another.

However, in some situations mobility is required in the communications stack. FIG. 2 shows a mobile phone 201, which is connected to a WiFi™ access point 202. In this scenario, the user of the mobile phone 201 is browsing the Web using a Web browser. The communications framework on the phone 201 has established the necessary protocols for this process to take place. If the user becomes mobile in the direction of arrow 203, the phone 201 moves out of the area of coverage 204 of the WiFi™ access point 202. In order for the user to continue browsing the Web, the communications framework must establish an alternative connection. This can be done by breaking the connection and then re-establishing it over a different bearer. However, it may be more desirable to do this within the communications stack, using some mobility mechanism that keeps the original connection undisturbed as far as the client application is concerned. This particular scenario would require mobility at the link layer of the communications stack. In FIG. 2, the communication framework loaded on phone 201 is not capable of mobility. In the scenario shown in FIG. 2, the connection with the WiFi™ access point, and hence the connection to the Web, would be lost.

Systems are currently being developed which allow mobility in the communications framework. Generic Access Network (GAN) is one such system which is being developed and which enables a connection to remain active when a user moves away from, for example, a WiFi™ hotspot to an area which is only covered by the mobile telephone network (or vice versa). This requires a switch in the link layer protocols being used by the communications framework. The communications framework is required to maintain a connection while transferring that connection from, for example, IEEE 802.11 link layer protocol to a cellular link layer protocol such as 3G.

Such systems allow mobility at the link layer of the communications stack (e.g. between WiFi™ and GPRS protocols). Known systems are not able to provide mobility at any arbitrary layer in a protocol stack.

The aim of mobility is to offer increased connection duration to a device user. The requirement for mobility has dramatically increased recently as a result of smaller and more complex computing devices. Such devices have a wider range of technologies available for them to use for communication. As a result, the number of possible protocols which may be supported at any level of a communications stack has increased. For example, standards such as Voice Call Continuity (VCC) require mobility of a voice call between a Circuit Switched Data (CSD) protocol stack and a Voice over IP (VoIP) stack. At the same time there is a desire to make the operation of the communications framework transparent to users. There is therefore the need for a more flexible communications framework which is able to support mobility at any level of the communications stack.

SUMMARY OF THE INVENTION

The present invention provides a computing device having stored thereon a communications framework, the framework comprising a plurality of layers, each layer arranged to encapsulate a communications protocol, at least one of said layers being a mobile layer, arranged to load one of a plurality of lower bearer layers, wherein the mobile layer is arranged to: a) monitor the availability of lower adjacent bearer layers, b) determine whether or not to migrate to a new bearer layer, when that bearer layer becomes available, and c) initiate migration to a new bearer layer if it is determined that migration should take place.

The present invention provides a method of controlling bearer layer migration in a communications framework, the framework comprising a plurality of layers, each layer arranged to encapsulate a communications protocol, at least one of said layers being a mobile layer, arranged to load one of a plurality of lower bearer layers, the method comprising the steps of: a) monitoring the availability of lower adjacent bearer layers; b) determining whether or not to migrate to a new bearer layer, when a bearer becomes available, and c) migrating to the new bearer layer if it is determined that migration should take place.

Other features of the present invention are defined in the appended claims. Features and advantages associated with the present invention will be apparent from the following description of the preferred embodiments.

BRIEF DESCRIPTION OF THE DRAWINGS

The invention will now be described in more detail by way of example only and with reference to the accompanying drawings in which.

DESCRIPTION OF THE EMBODIMENTS

Figure 3:
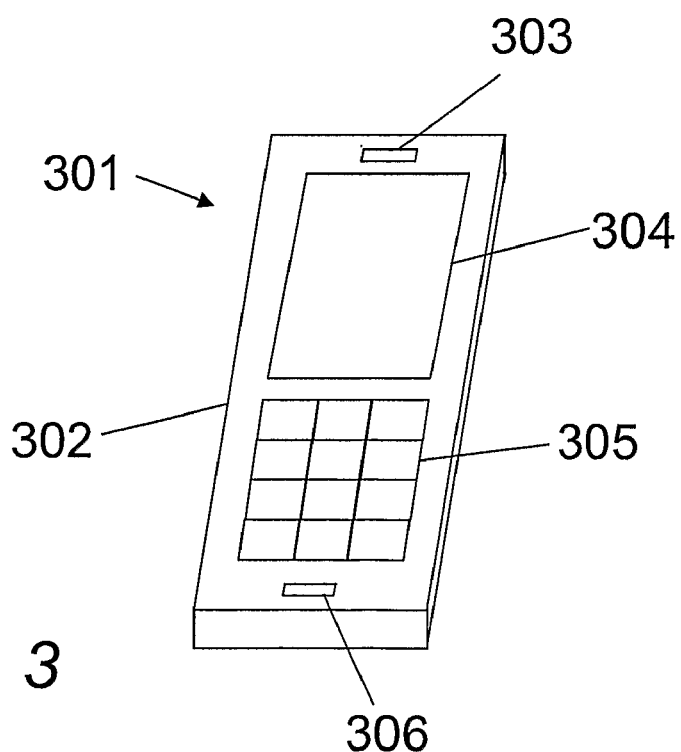
FIG. 3 is a mobile device in accordance with an embodiment of the invention.

Referring to FIG. 3, a mobile device 301 comprises an outer casing 302, which includes an earphone 303 and a microphone 304. The mobile device 301 also includes a keypad 305 and a display 306. The keypad 305 enables a user to enter information into the mobile device 301 and instruct the mobile device to perform the various functions which it provides. For example, a user may enter a telephone number, or select another mobile device from a list stored on the mobile device 301, as well as perform functions such as initiating a telephone call.

Figure 4:
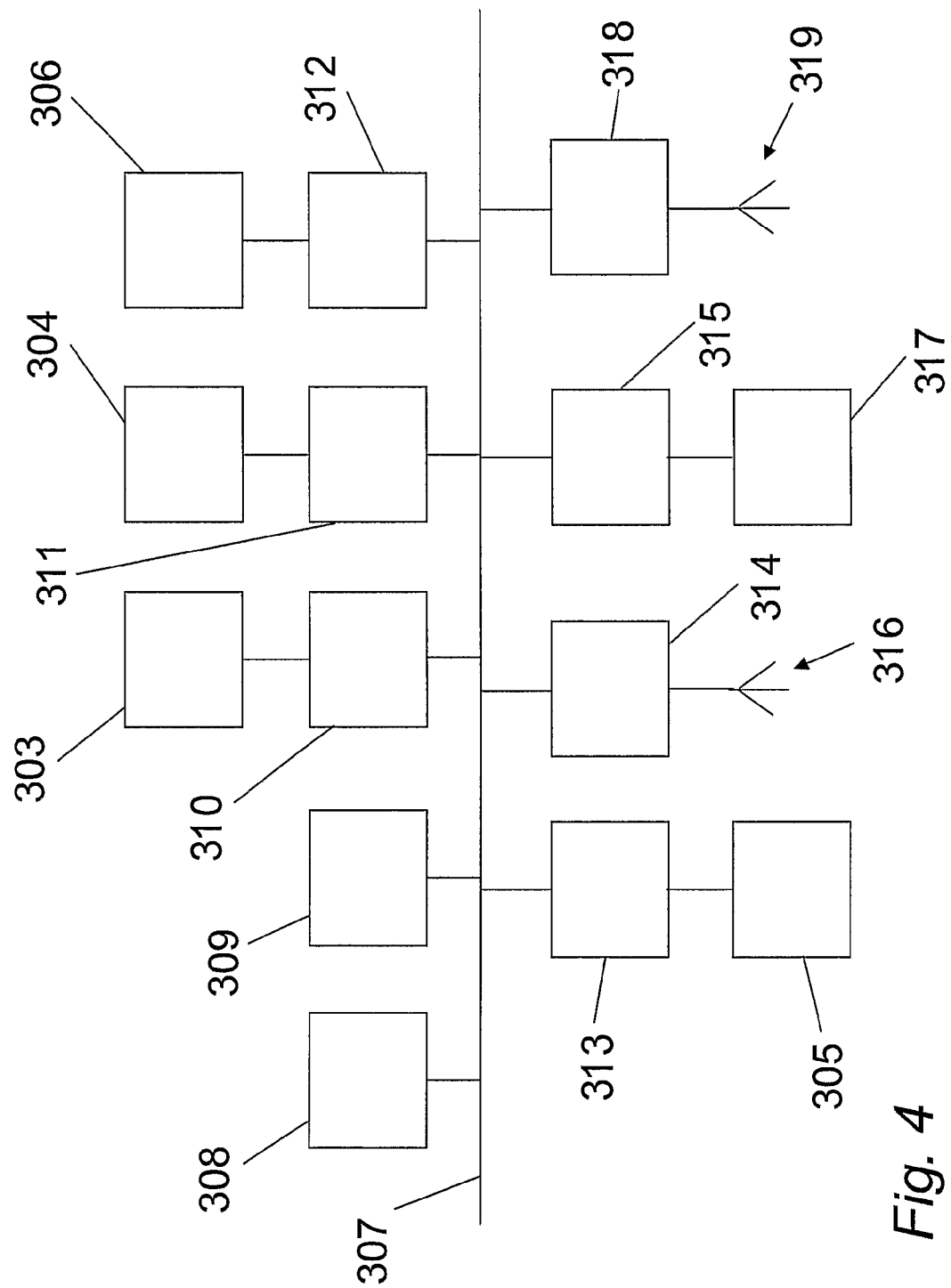
FIG. 4 is schematic diagram showing the components of the mobile device of FIG. 3.

FIG. 4 is a schematic diagram showing the components of the mobile device 301. The device includes a system bus 307 to which the components are connected and which allows the components to communicate with each other. Here, the components are shown to communicate via a single system bus 307. However, in practice the mobile device may include several buses to connect the various components. The components of the mobile device 301 include a processor unit 308, memory 309, an earphone controller 310, a microphone controller 311, a display controller 312, a keyboard controller 313, a transceiver 314 and a storage device controller 315. FIG. 4 shows a single processor unit 308, however in practice the device may include two or more processor units to control different components of the device. In particular, the device 301 may include a baseband processor unit to control a telephony stack, and an application processor to control an operating system and a user interface of the device. The transceiver 314 is also connected to an antenna 316. The mobile device 301 is arranged to communicate, using transceiver 314, with a base station of a mobile phone network (not shown). The storage device controller 315 is connected to a storage device 317 which may be an internal hard drive or a removable storage device such as a flash memory card. The device 301 also includes a WiFi™ unit 318 which is connected to a WiFi™ antenna 319.

Figure 1:
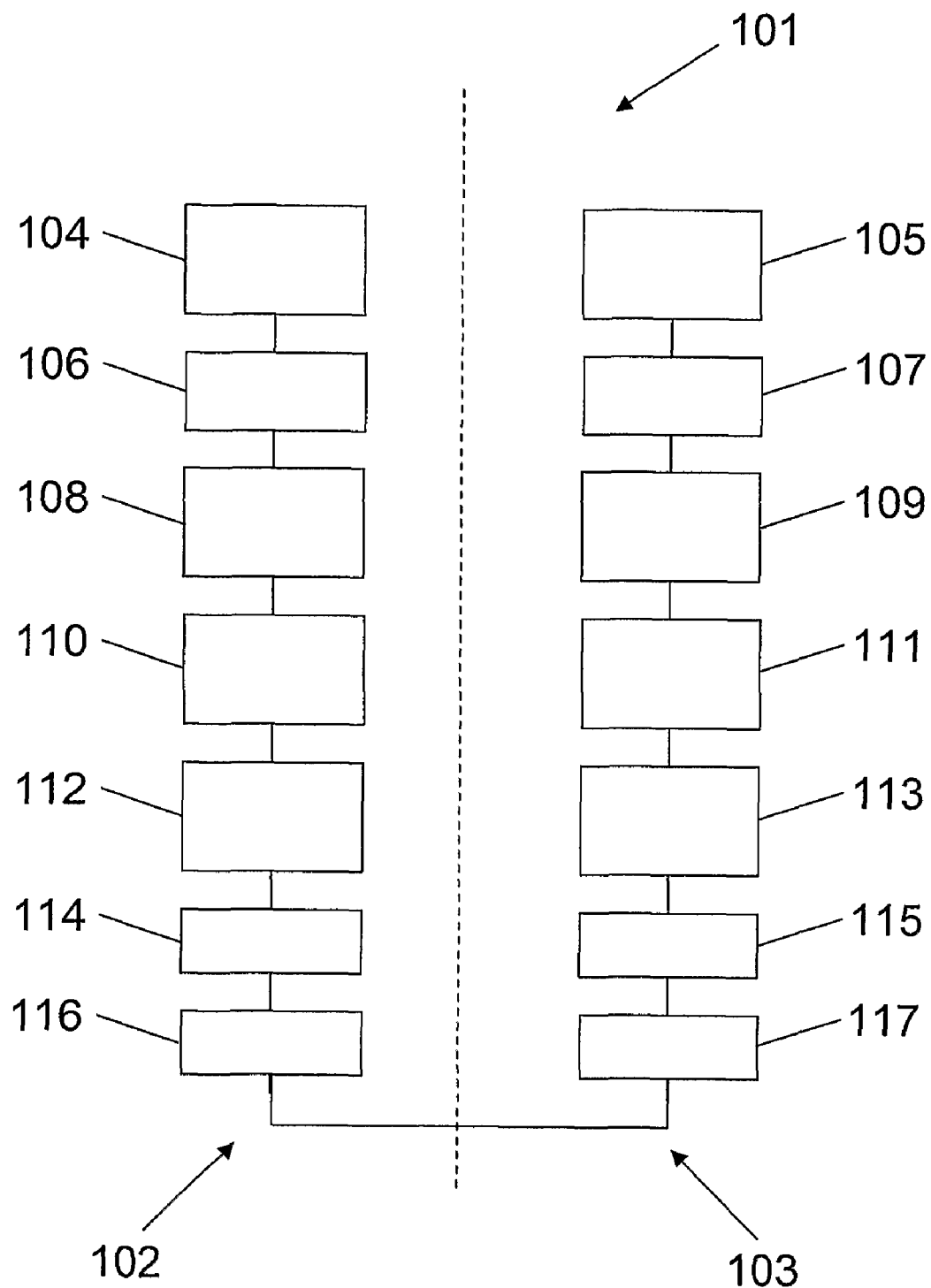
FIG. 1 is a diagrammatic representation of a communications model known from the prior art.
Figure 2:
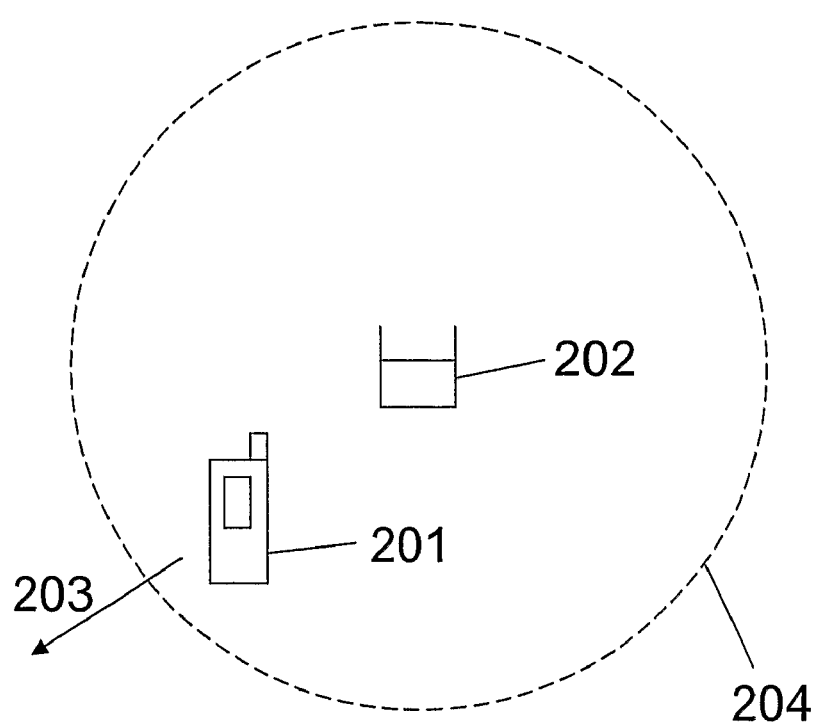
FIG. 2 is a diagram of an environment in which a mobile phone known from the prior art operates.

As seen above in connection with FIG. 1, a typical communications framework includes a number of horizontal layers, each layer representing a different protocol or set of protocols. Each of these layers may be referred to as a communications framework layer (CF layer). The layers shown in FIG. 1 represent known protocols which communicate with adjacent upper and lower protocols in order to pass data up and down the communications stack. In this respect, FIG. 1 represents the flow of data between two endpoints. However, the components shown in FIG. 1 do not reveal anything about how the stack came into being or how the established connections are controlled. The protocol stack cannot exist by itself, there needs to be something to configure it. This is handled by the communications framework.

There are three main types of activity which the communications framework must undertake. Firstly, there is decision making based on established polices and configurations. This involves deciding which protocols must be loaded in response to a request from a particular client. Secondly, there is the establishment, control and tearing down of each instance of a protocol as a result of the above decision. Thirdly, there is the actual data transfer which takes place over the protocols which have been established.

The communications framework of the present embodiment is therefore split into three planes (CF planes), each plane being arranged to handle one of the above noted activities. The CF planes are respectively called the management plane, the control plane and the data plane. The management plane is for decision making based on established policies and configurations. The control plane is used to establish, bind, control, re-bind and tear down the protocol stack based on commands from the management plane and from a client application. The data plane is used to transport data as efficiently as possible based on established protocols.

Figure 5:
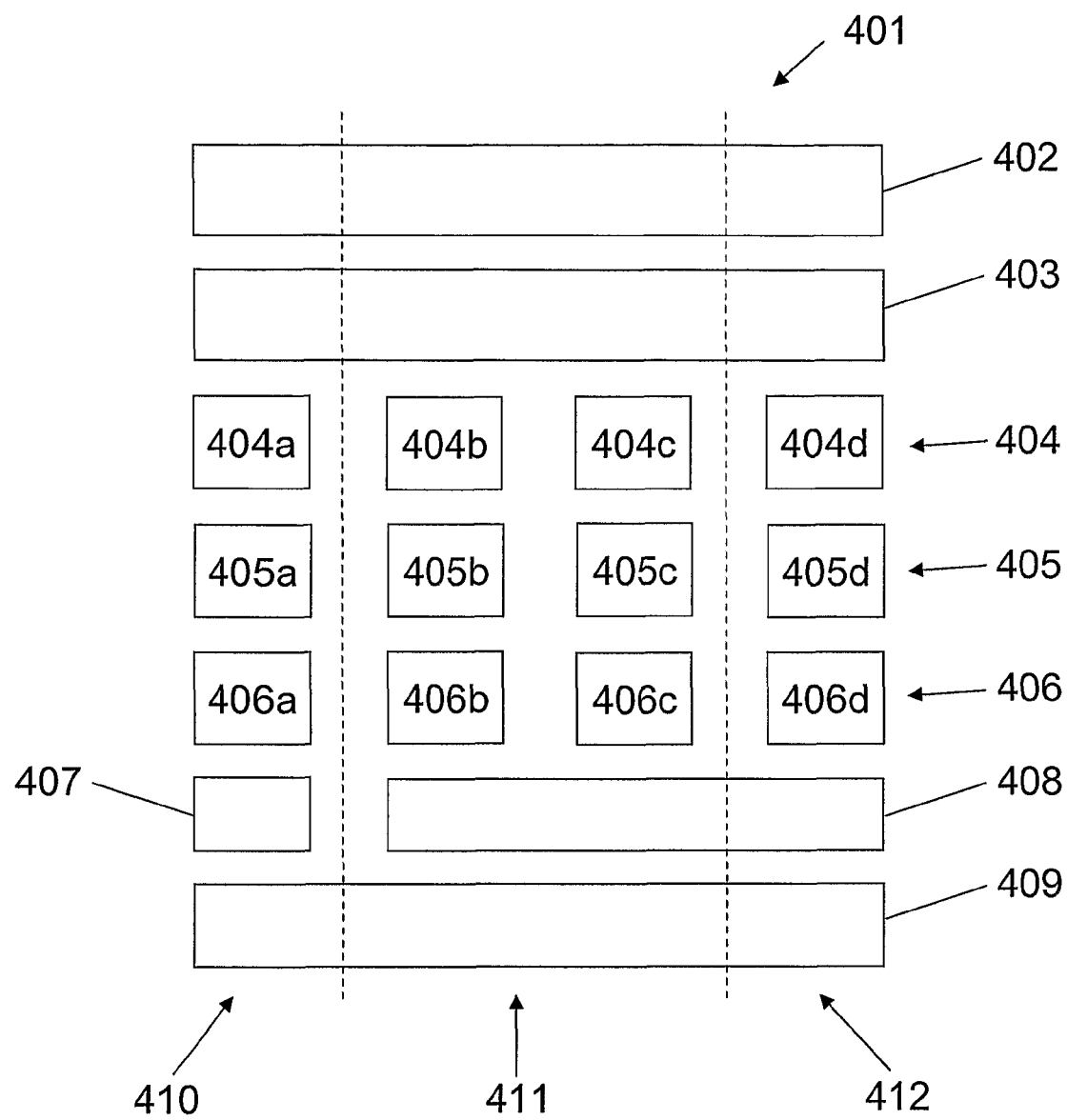
FIG. 5 is diagrammatic representation of a communications framework in accordance with an embodiment of the invention.

As the layers of the protocol stack are conceptually thought of in horizontal terms, the CF planes are arranged vertically. Each layer of the communications framework has data, control and management elements. FIG. 5 is a communications framework in accordance with an embodiment of the invention.

As with the communications framework shown in FIG. 1, the framework 401 of FIG. 5 is divided into a number of layers. At the top of the framework 401 is an application 402 which is able to send messages, or communicate in some other way with a remote computer. The adjacent lower layer of the framework 401 is a communication framework API 403. This provides the interface through which the application 402 communicates with the communications framework 401. The communications framework also includes three protocol layers which are arranged beneath the communication framework API 403. These layer's are a transport layer 404, a network layer 405 and a link layer 406. It will be appreciated that the communications framework is not limited to three layers. Further layers may be provided dependent upon the technology being used. The framework also includes a hardware driver 407, communications bearers 408 and hardware 409.

Each layer of the communications framework for a particular connection is an Access Point (AP). An AP is an instance of the layer technology configured for a particular purpose. An adjacent lower layer AP is the bearer, or carrier, for an adjacent upper layer AP. Associated with each AP is AP meta-data. The AP meta-data includes policy information. The AP uses this information when making decisions concerning which AP to use for the bearer layer for the current connection. If the AP has a choice of more than one bearer layer AP, it is said to be a mobile AP.

As noted above, the communications framework is split into three planes. These planes are separated by the broken lines shown in FIG. 5. On the left of the communications framework 401 is the data plane 410. In the middle of the framework 401 is control plane 411. On the right is the management plane 412. The protocol layers are separated into a number of nodes, each of which is associated with a particular CF layer and a particular CF plane. Each CF layer includes a CF Protocol (CFP) node 404a, 405a and 406a in the data plane 410. These nodes implement the data exchange for a particular CF layer. Within the control plane 411, each layer includes at least two nodes. Firstly there are one or more Sub-Connection Provider (SCPR) nodes 404b, 405b and 406b. Secondly, there is a Connection Provider (CPR) node 404c, 405c and 406c. The CPR node implements connection establishment and control for the relevant CF layer. The SCPR nodes implement sub-connection establishment and control for the relevant CF layer. These sub-connections are individual data channels which may be established over a particular connection. Within the management plane 412, each protocol layer includes one Meta Connection Provider (MCPR) node 404d, 405d and 406d. These nodes implement policy management and configuration for connections within a particular CF Access Point. Each MCPR node encapsulates and implements a set of AP meta-data.

The above described nodes communicate with each other using message passing. Each node can communicate with adjacent nodes in the same CF layer and adjacent upper and low nodes of the same type in different CF layers. Each node may therefore communicate in four different directions. All communication between nodes in the control and management planes is asynchronous. Vertical movement of payload data between nodes in the data plane is synchronous, as is the vertical movement of control information in this plane. Horizontal communication between CFP nodes and an SCPR node is asynchronous.

The above described framework can be used to enable mobility at any protocol layer of the communications framework. Each layer of the protocol stack can encapsulate different protocols. At the link layer, the protocol in use will depend upon the physical connection being used by the computing device. For example, if the physical connection is a WiFi™ link, then the link layer uses the IEEE 802.11 link layer protocol. If the connection is an Ethernet connection, the link layer is the Ethernet link layer protocol. The network layer may be Internet Protocol (IP), for example. The transport layer may be TCP, User Datagram Protocol (UDP), etc. Protocols for higher layers in the communications stack such as, for example, SIP (Session Initiation Protocol) and RTP (Real-Time Transport Protocol) may also be encapsulated as layers in the protocol stack. Many other protocols exist and the communications framework 100 is arranged to handle any such protocol.

At each layer, a particular protocol is a bearer for the adjacent upper layer. For example, a WiFi™ link layer protocol, may be the bearer for the IP protocol. The IP protocol may, in turn, be a bearer for the TCP protocol. As noted above, each protocol has an associated configuration specified by the AP so it offers a specific instance of the technology as a service for one or more connections.

At any one time a communications stack in a device may host multiple concurrent connections running over multiple different Access Points via multiple different technologies.

Within an AP, the MCPR node is responsible for monitoring the availability of the lower bearer AP. Within a mobile AP, the MCPR is also responsible for monitoring the availability of any APs that are configured as alternatives to the current active bearer AP. At a link layer AP (the bottom layer in the stack above the hardware) an MCPR is responsible for monitoring the availability of the service from the hardware or the network.

In a mobile AP, if a new, preferred, bearer AP becomes available, the MCPR node in the mobile AP may notify its upper layer that a new bearer AP is available. The decision whether or not to migrate is then deferred to an upper layer or to the application. Alternatively, the MCPR may decide itself whether or not to initiate migration.

Figure 6:
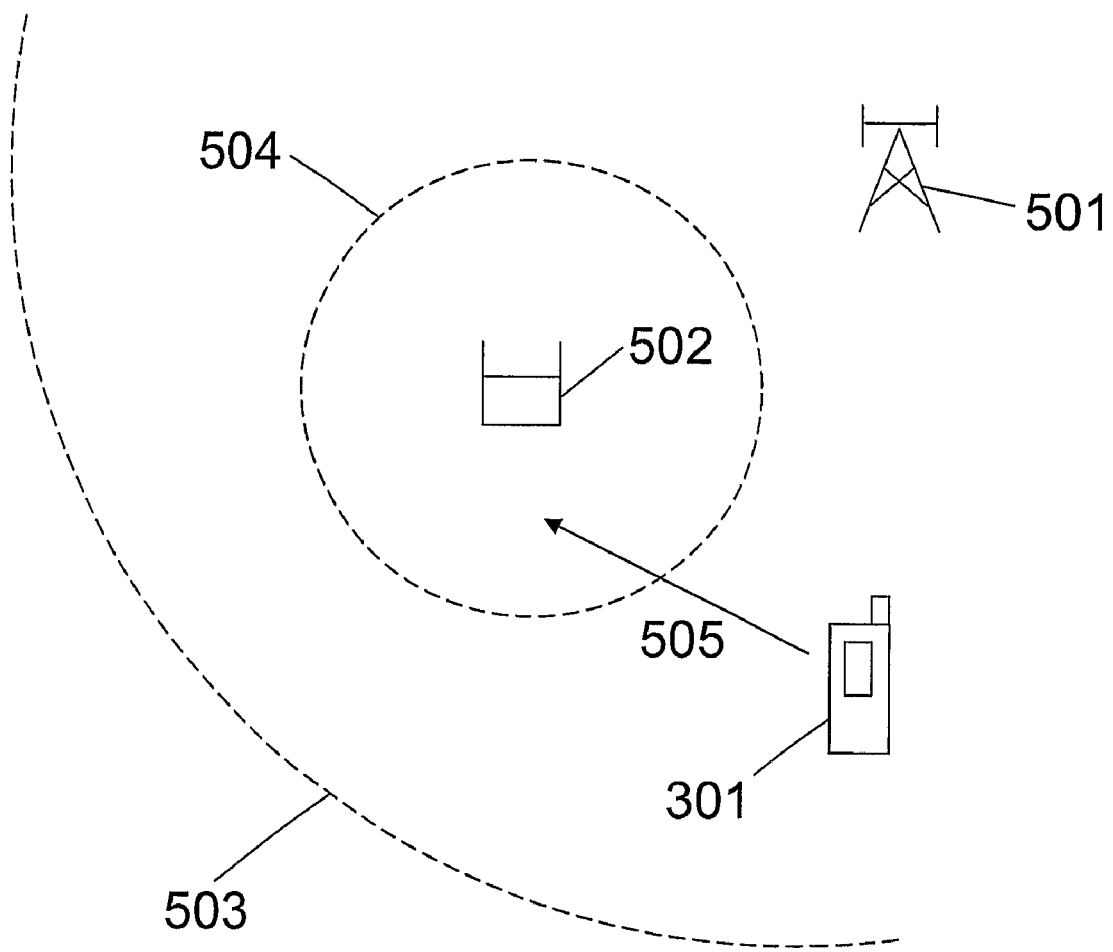
FIG. 6 is a diagram of an environment in which the mobile device of FIG. 3 operates.

Referring to FIG. 6, the mobile device 301 is shown in an environment which includes a mobile phone base station 501 and a WiFi™ access point 502. The base station 501 has an area of coverage 503 and the WiFi™ access point 502 has an associated hotspot 504. In the diagram, the device 301 is in a geographical position such that any communications with remote devices must take place through the mobile phone network (not shown). In FIG. 6, the user of the device is browsing the Web using a Web browser loaded on device 301. The communications framework 401 has established a protocol stack. The transport layer 404 is the TCP protocol and the network layer 405 is the IP protocol. The protocol stack is established over a GPRS connection with the base station 501. The link layer 406 is therefore the GPRS link layer protocol.

As shown by arrow 505, the mobile device 301 moves with the hotspot 504 of WiFi™ access point 502. In the present case, the device is arranged to transfer a connection to a particular WiFi™ access point when it is available. The mechanism by which the necessary CF APs migrate to an alternative bearer AP will now be described.

Before any bearer migration can take place, the mobile layer must register for availability notifications with lower layer MCPRs. In the present case, the network layer MCPR node 405d must register with the link layer 406 for availability notifications. For example, it may register with IEEE 802.11 and GPRS link layers for availability notifications. When the link layer MCPR node 406d determines that its service is available, it informs the link layer MCPR node 405d that this is the case. In the present case, the network layer MCPR node 405d is configured such that an IEEE 802.11 link layer protocol is more preferable than a GPRS link layer protocol. When the mobile device 301 moves into WiFi™ hotspot 504, the availability of the IEEE 802.11 access point is notified to the link layer MCPR node 406d. This change in availability is passed on to the network layer MCPR node 405d. This node determines that the available AP is more preferable than the existing GPRS link layer bearer and may optionally also request validation of this decision from the client application that owns the connection (step not shown).

The network layer MCPR node 405d then decides whether or not to accept the new bearer. In the present case, the bearer is accepted and the network layer MCPR node 405d determines that it should create and start the new bearer. This creates and starts a new link layer for the IEEE 802.11 protocol represented up to now just by the MCPR. Once the new layer is created and started, the Network MCPR (405d) migrates the connection away from the GPRS AP (420) to the IEEE 802.11 AP.

The network layer MCPR node 406d then informs the link layer GPRS MCPR node that the connection is migrating away to a new bearer. The link layer IEEE 802.11 MCPR node 406d then informs the network layer MCPR node 405c that the new bearer is active. The network layer 405 may then optionally inform the client application that owns the connection that the migration is complete so that it may optionally re-establish connection sockets (step not shown). The GPRS AP will be automatically shutdown at some short time afterwards if it is not still in use for another connection. The MCPR of the abandoned layer will remain and will continue to monitor availability and to report its status to the Mobile AP MCPR.

The mobile AP may choose not to act on an availability change indication from lower layers, in which case there is no change in the existing stack behaviour or stack structure. The availability indication is simply ignored at the mobile AP MCPR and no migration ensues (the sequence just described would not go further than step 603.

As noted above, the above described system is arranged to provide mobility at any layer of the communications stack. At higher layers in the stack the bearers for a mobile AP would in turn have APs stacked beneath them. The MCPR nodes may be referred to as management nodes. These nodes may be provided as plug-ins which may be referred to as decision point plug-ins. These plug-ins enable the mechanism which provides the service selection and service mobility to be separated from the decision making part of the framework. For example, a mobile device can be provided with the above described communications framework, but with standard decision point plug-ins. The phone vendor is then able to supply their own specialised plug-ins which can be configured with any service selection and mobility polices the vendor desires. This feature enables devices to be customised easily which improves time-to-market and enables manufactures to differentiate products.

It will be appreciated that the term "bearer" may refer to any layer of the communication framework. In this context, one layer may act as bearer for the upper adjacent layer. The term is not limited to, for example, the very bottom layer, as may have been the case with more traditional usage of the term.

Various modifications, changes, and/or alterations may be made to the above described embodiments to provide further embodiments which use the underlying inventive concept, falling within the spirit and/or scope of the invention. Any such further embodiments are intended to be encompassed by the appended claims.

The invention claimed is:

1. A computing device comprising at least one processor and a memory having stored thereon a communications framework, the framework comprising a plurality of layers, each layer arranged to encapsulate a communications protocol, at least one of said layers being a mobile layer, arranged to load one of a plurality of lower bearer layers, wherein the mobile layer is configured to: a) monitor the availability of lower adjacent bearer layers, b) determine whether or not to migrate to a new bearer layer, when that bearer layer becomes available, and c) initiate migration to a new bearer layer if it is determined that migration should take place.

2. A computing device according to claim 1, wherein said mobile layer is further configured to determine whether or not a new bearer layer is a preferred bearer layer.

3. A computing device according to claim 2, wherein said mobile layer is further configured to notify an upper adjacent layer when a preferred bearer layer is available.

4. A computing device according to claim 3, wherein said mobile layer is further configured to determine whether or not an adjacent lower bearer layer should migrate to a preferred bearer layer when such a bearer layer becomes available.

5. A computing device according to claim 4, wherein each mobile layer comprises a management part configured to monitor the availability of lower adjacent bearer layers and to determine whether or not a new bearer layer is a preferred bearer.

6. A computing device according to claim 5, wherein said mobile layer comprises a control part, configured to receive notifications from the management part of the same layer regarding the availability of preferred bearer layers.

7. A computing device according to claim 6 wherein said control parts are further configured to notify control part of an upper adjacent layer when a preferred bearer is available.

8. A computing device according to claim 7, wherein said control parts are configured to decided, based on pre-stored policies, whether or not said lower adjacent layer should migrate to a preferred bearer layer.

9. A computing device according to claim 8, wherein said control parts are configured to notify a control part of a lower adjacent layer if it decides that the lower adjacent layer should migrate to a preferred bearer layer.

10. A computing device according to claim 9 wherein said control parts are configured to notify a management part of the same layer if it receives notification from a control part of an upper adjacent layer that the layer should migrate to a new bearer layer.

11. A computing device according to claim 10 wherein said control part of a mobile layer is further configured to notify the control part of a lower adjacent layer if it requires notification that a preferred bearer layer is available.

12. A computing device according to claim 1 wherein the communications framework comprises a data plane configured to move data through the framework and to exchange data with remote peer protocols.

13. A computing device according to claim 5, wherein said management part has stored therein bearer layer preferences.

14. A computing device according to claim 5, wherein said management part has stored therein a policy mechanism to determine bearer layer preferences.

15. A computing device according to claim 5, wherein each control part and each management part is a node, said nodes forming a mesh of nodes.

16. A computing device according to claim 15 wherein said management node is a plug-in component.

17. A method of controlling bearer migration in a communications framework, the framework comprising a plurality of layers, each layer configured to encapsulate a communications protocol, at least one of said layers being a mobile layer configured to load one of a plurality of lower bearer layers, the method comprising:
- a) monitoring the availability of lower adjacent bearer layers;
- b) determining, with at least one processor, whether or not to migrate to a new bearer layer, when a bearer becomes available, and
- c) migrating to the new bearer layer if it is determined that migration should take place.

18. A method according to claim 17, wherein determining whether or not to migrate to a new bearer layer includes determining whether or not a new bearer is a preferred bearer.

19. A non-transitory computer readable medium storing a computer program, or at least one of a suite of computer programs, configured such that, when executed by a computer, the computer is caused to control bearer migration in a communications framework, the framework comprising a plurality of layers, each layer configured to encapsulate a communications protocol, at least one of said layers being a mobile layer configured to load one of a plurality of lower bearer layers, wherein the computer is caused to control bearer migration by:

monitoring the availability of lower adjacent bearer layers;

determining whether or not to migrate to a new bearer layer, when a bearer becomes available, and causing migration to the new bearer layer in an instance in which it is determined that migration should take place.

* * * * *